(12) United States Patent
Winter

(10) Patent No.: US 9,225,042 B2
(45) Date of Patent: Dec. 29, 2015

(54) INTEGRAL MANIFOLD

(75) Inventor: Alexander Rudolf Winter, Seventeen Mile Rocks (AU)

(73) Assignee: RedFlow R&D Pty Ltd (AU)

( * ) Notice: Subject to any disclaimer, the term of this patent is extended or adjusted under 35 U.S.C. 154(b) by 986 days.

(21) Appl. No.: 13/057,379

(22) PCT Filed: Aug. 21, 2009

(86) PCT No.: PCT/AU2009/001078
§ 371 (c)(1),
(2), (4) Date: May 2, 2011

(87) PCT Pub. No.: WO2010/020013
PCT Pub. Date: Feb. 25, 2010

(65) Prior Publication Data
US 2011/0206960 A1    Aug. 25, 2011

(30) Foreign Application Priority Data
Aug. 22, 2008  (AU) ................. 2008904314

(51) Int. Cl.
*H01M 2/40* (2006.01)
*H01M 10/36* (2010.01)
(Continued)

(52) U.S. Cl.
CPC ............. *H01M 10/365* (2013.01); *B29C 33/76* (2013.01); *B29C 45/2628* (2013.01);
(Continued)

(58) Field of Classification Search
CPC .......... H01M 2/36; H01M 2/40; B29C 45/00; B29C 45/03; B29C 45/14; B29C 45/44; B29C 45/4457–45/4478; B29C 65/78; B29C 65/7805; B29C 65/7814; B29C 65/7838; B29D 23/00–23/008

USPC ........ 429/70, 72; 264/318, 221–227, 29, 239, 264/299, 313, 317; 204/242, 275.1, 278.5, 204/267; 249/142–145, 177, 160, 165–166
See application file for complete search history.

(56) References Cited

U.S. PATENT DOCUMENTS 3,755,514 A * 8/1973 Bennett ........................... 64/442
4,352,772 A * 10/1982 Bezner ........................ 264/229
(Continued)

FOREIGN PATENT DOCUMENTS

EP         0093213 B1    9/1987
JP     2004-319341 A   11/2004
(Continued)

OTHER PUBLICATIONS

"International Application No. PCT/AU2009/001078, International Search Report mailed Sep. 29, 2009", (Sep. 29, 2009), 4 pgs.
(Continued)

*Primary Examiner* — Gary Harris
(74) *Attorney, Agent, or Firm* — Schwegman Lundberg & Woessner, P.A.

(57) ABSTRACT

A method of forming passages of an integral manifold adjacent a cell stack of a flowing electrolyte battery provides enhanced sealing between the manifold and capillary tubes of the cell stack. The method includes forming a mould cavity adjacent the cell stack, with the mould cavity open to capillary openings of cells of the cell stack. A plurality of pins are then located in the mould cavity, with end regions of the pins being contiguous with the capillary openings. The mould cavity is then filled with material and the material is allowed to solidify into a moulded section. The pins are then removed from the moulded section, thereby forming passages in the moulded section which are in fluid communication with the capillary openings.

8 Claims, 5 Drawing Sheets

(51) Int. Cl.
  *B29C 33/76*  (2006.01)
  *B29C 45/26*  (2006.01)
  *H01M 8/24*   (2006.01)
  *H01M 12/08*  (2006.01)
  *B29C 45/44*  (2006.01)
  *B29L 31/00*  (2006.01)

(52) U.S. Cl.
  CPC ........... *H01M 8/241* (2013.01); *H01M 8/2465* (2013.01); *H01M 12/085* (2013.01); *B29C 45/44* (2013.01); *B29L 2031/7146* (2013.01); *Y02E 60/50* (2013.01)

(56) References Cited

U.S. PATENT DOCUMENTS

| | | | |
|---|---|---|---|
| 4,464,324 A * | 8/1984 | Hager | 264/221 |
| 4,661,055 A | 4/1987 | Thivichon-Prince et al. | |
| 5,034,023 A | 7/1991 | Thompson | |
| 5,188,911 A | 2/1993 | Downing et al. | |
| 5,556,582 A * | 9/1996 | Kazmer | 264/40.1 |
| 5,562,741 A | 10/1996 | Meadows et al. | |
| 6,073,536 A * | 6/2000 | Campbell | 91/516 |
| 6,309,208 B1 * | 10/2001 | Kazmer et al. | 425/562 |
| 7,175,413 B1 * | 2/2007 | Graham | 425/441 |
| 7,708,923 B1 * | 5/2010 | Helicke et al. | 264/261 |
| 8,591,708 B2 * | 11/2013 | Potchen et al. | 204/278.5 |

FOREIGN PATENT DOCUMENTS

| | | |
|---|---|---|
| WO | WO-02/25756 A1 | 3/2002 |
| WO | WO-2008/041736 A1 | 4/2008 |
| WO | WO-2008/116248 A1 | 10/2008 |
| WO | WO-2010/020013 A1 | 2/2010 |

OTHER PUBLICATIONS

"European Application No. 09807764.7, Extended European Search Report mailed Mar. 5, 2014", (Mar. 5, 2014), 6 pgs.

* cited by examiner

US 9,225,042 B2

INTEGRAL MANIFOLD

PRIORITY CLAIM TO RELATED APPLICATIONS

This application is a national stage application under 35 U.S.C. §371 of PCT/AU2009/001078, filed Aug. 21, 2009, and published as WO 2010/020013 A1 on Feb. 25, 2010, which claims priority to Australian Application No. 2008904314, filed Aug. 22, 2008, which applications and publication are incorporated herein by reference and made a part hereof in their entirety, and the benefit of priority of each of which is claimed herein.

FIELD OF THE INVENTION

The present invention relates to flowing electrolyte battery manifolds. In particular, although not exclusively, the invention relates to a method of forming an integral manifold for a cell stack of a flowing electrolyte battery.

BACKGROUND TO THE INVENTION

Batteries used in stand alone power supply systems are commonly lead-acid batteries. However, lead-acid batteries have limitations in terms of performance and environmental safety. Typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal.

Flowing electrolyte batteries, such as zinc-bromine batteries, zinc-chlorine batteries, and vanadium flow batteries, offer a potential to overcome the above mentioned limitations of lead-acid batteries. In particular, the useful lifetime of flowing electrolyte batteries is not affected by deep discharge applications, and the energy to weight ratio of flowing electrolyte batteries is up to six times higher than that of lead-acid batteries.

However, manufacturing flowing electrolyte batteries can be more difficult than manufacturing lead-acid batteries. A flowing electrolyte battery, like a lead acid battery, comprises a stack of cells to produce a certain voltage higher than that of individual cells. But unlike a lead acid battery, cells in a flowing electrolyte battery are hydraulically connected through an electrolyte circulation path. This can be problematic as shunt currents can flow through the electrolyte circulation path from one series-connected cell to another causing energy losses and imbalances in the individual charge states of the cells. To prevent or reduce such shunt currents, flowing electrolyte batteries define sufficiently long electrolyte circulation paths between cells, thereby increasing electrical resistance between cells.

Electrolyte is commonly supplied to and discharged from a cell stack via external manifolds. Each cell has multiple inlets and outlets at capillary openings of the electrolyte circulation paths. Each external manifold is connected to the circulation paths of the cell stack using a delicate connection apparatus comprising an array of elastomer connection tubes. A typical 54-cell stack requires 216 elastomer connection tubes. Such a delicate connection apparatus is not only difficult to manufacture, but is also prone to damage during assembly and use.

Referring to FIG. 1, a diagram illustrates a perspective view of a cell stack 10 for a flowing electrolyte battery, as known according to the prior art. Cells in the cell stack 10 are connected to external manifold bodies 12 via an array of elastomer connection tubes 14.

There is therefore a need to overcome or alleviate many of the above discussed problems associated with flowing electrolyte batteries of the prior art.

OBJECTS OF THE INVENTION

Therefore, an object of the present invention is to overcome or alleviate one or more limitations of the prior art including providing improved manifolds for flowing electrolyte batteries.

A further object of the present invention is to provide a method of forming an integral manifold for a cell stack of an electrolyte battery.

SUMMARY OF THE INVENTION

In a first form, although it need not be the only or indeed the broadest form, the invention resides in a method of forming passages of an integral manifold adjacent a cell stack of a flowing electrolyte battery, the method including:

forming a mould cavity adjacent the cell stack, wherein the mould cavity is open to capillary openings of cells of the cell stack;

locating a plurality of pins in the mould cavity, wherein end regions of the pins are contiguous with the capillary openings;

filling the mould cavity with material;

allowing the material to solidify into a moulded section; and removing the pins from the moulded section, thereby forming passages in the moulded section which are in fluid communication with the capillary openings.

Preferably, the method includes forming a manifold cavity adjacent the passages and into which the passages open.

In one embodiment, a manifold plug that defines the manifold cavity is inserted into the mould cavity before filling the mould cavity with material, and the pins pass through the manifold plug.

In another embodiment, the manifold cavity is formed by machining the manifold cavity into the moulded section.

Preferably, the method includes closing off parts of the passages which extend between the manifold cavity and an exterior of the moulded section.

Preferably, the capillary openings are defined at tube ends of capillary tubes which extend into the half cells.

Preferably, each pin in the plurality of pins has a head which is outside of the mould cavity as the material solidifies and an inner end which is received in one of the capillary openings.

Preferably, the head of each pin has a larger diameter than the inner end.

Preferably, the mould cavity is formed by formwork which is removed after the moulded section is formed.

Preferably, an extraction panel is used to remove the pins from the moulded section.

Preferably, the formwork has apertures defined therein, and each pin in the plurality of pins is located in an aperture when inserting each pin into the mould cavity.

The invention extends further to a flowing electrolyte battery having an integral manifold formed in accordance with the first form of the invention.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE INVENTION

Figure 1:
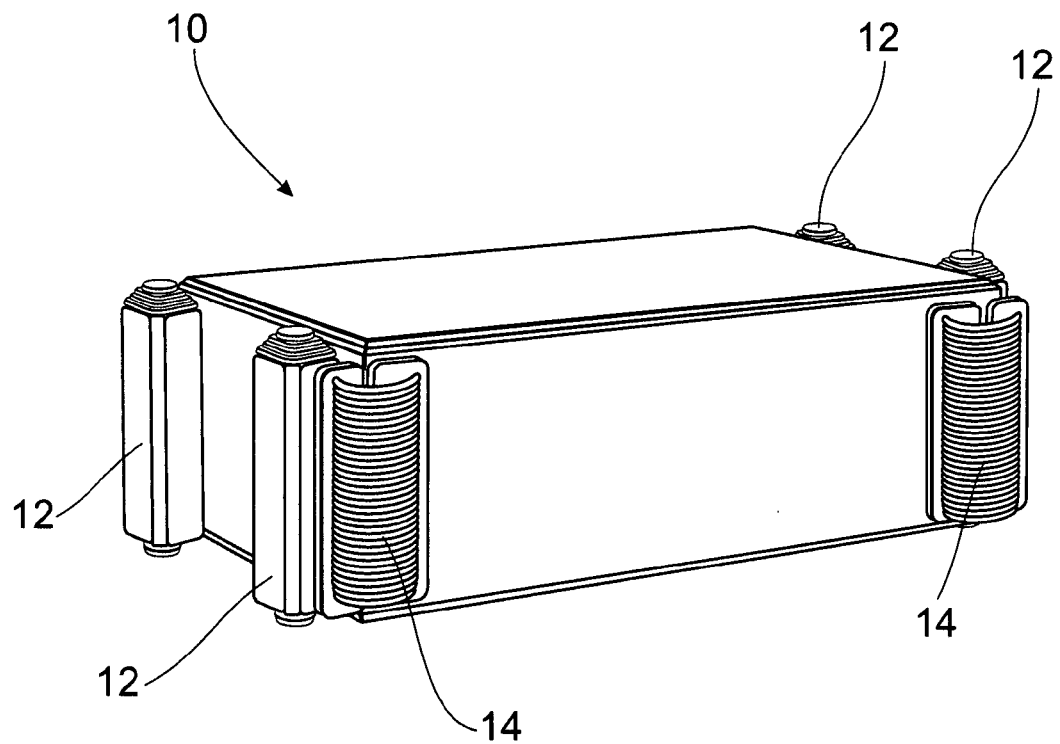
FIG. 1 is a diagrammatic perspective view of a flowing electrolyte battery with external manifolds, as known according to the prior art.

Embodiments of the present invention comprise a method of forming passages of an integral manifold adjacent a cell stack of a flowing electrolyte battery, and a flowing electrolyte battery having an integral manifold. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

A method of forming an integral manifold of a flowing electrolyte battery is described in sequence with reference to FIGS. 2, 3 and 5-8 of the drawings. The drawings show how an integral manifold is formed at only one corner of a cell stack of a flowing electrolyte battery. It must be appreciated that similar integral manifolds will be formed at all four corners of the cell stack or at other locations on the flowing electrolyte battery.

Figure 2:
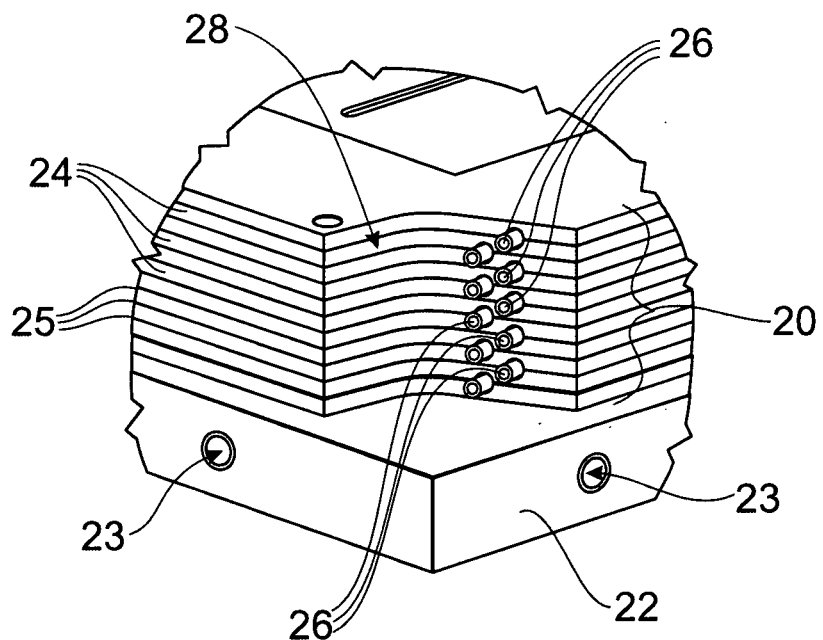
FIG. 2 is a diagrammatic perspective view of part of a cell stack of a flowing electrolyte battery located on top of a bottom panel of formwork.

Referring to FIG. 2, a diagram illustrates a perspective view of a corner of a cell stack 20 of a flowing electrolyte battery. As a first step to forming the integral manifold, the cell stack 20 is located on a bottom panel 22 of formwork. The bottom panel 22 has location holes 23 defined in its sides.

The cell stack 20 comprises a stack of electrode plates 24 separated by separator plates 25 to define a plurality of half cells. The half cells are similar to the half cells described in the Applicant's co-pending International Patent Application No. PCT/AU2008/000353, filed 13 Mar. 2008, published as WO 2008/116248, and incorporated herein by reference. The half cells each comprise an electrode plate 24, an adjacent separator plate 25 and a capillary tube 26. The capillary tubes 26 are positioned in capillary tube channels formed between each electrode plate 24 and adjacent separator plate 25. As shown, the capillary tubes 26 extend slightly out from the edges of the electrode plates 24 and separator plates 25. The half cells are generally rectangular in top plan view, but have a cut-away region 28 at corners thereof. The capillary tubes 26 can be of polymeric material or any other material that is compatible for welding to injected plastic.

The bottom panel 22 is part of a formwork which together defines a cavity adjacent the corner of the cell stack 20. The cavity will be described in more detail with reference to FIG. 5 of the drawings.

Figure 3:
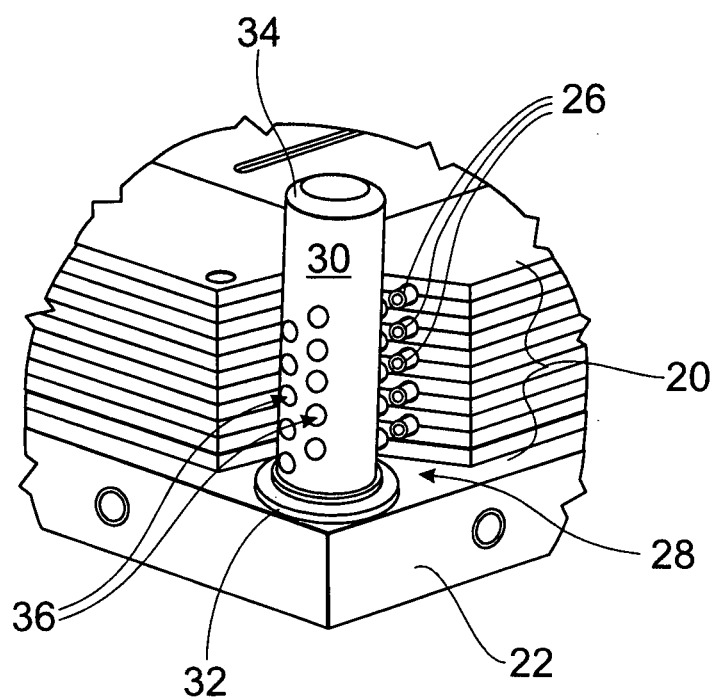
FIG. 3 is a diagrammatic perspective view of the part of the cell stack of FIG. 1 and a manifold plug located on the formwork bottom panel.

Referring to FIG. 3, a manifold plug 30 is located on the bottom panel 22. The manifold plug 30 is located in the cut-away region 28. The manifold plug 30 is generally cylindrical having a base 32 and an upper end 34. The base 32 is supported on the bottom panel 22. Two sets of staggered holes 36 are defined in the manifold plug 30. The holes 36 align with openings of the capillary tubes 26 of the cell stack 20.

Figure 4:
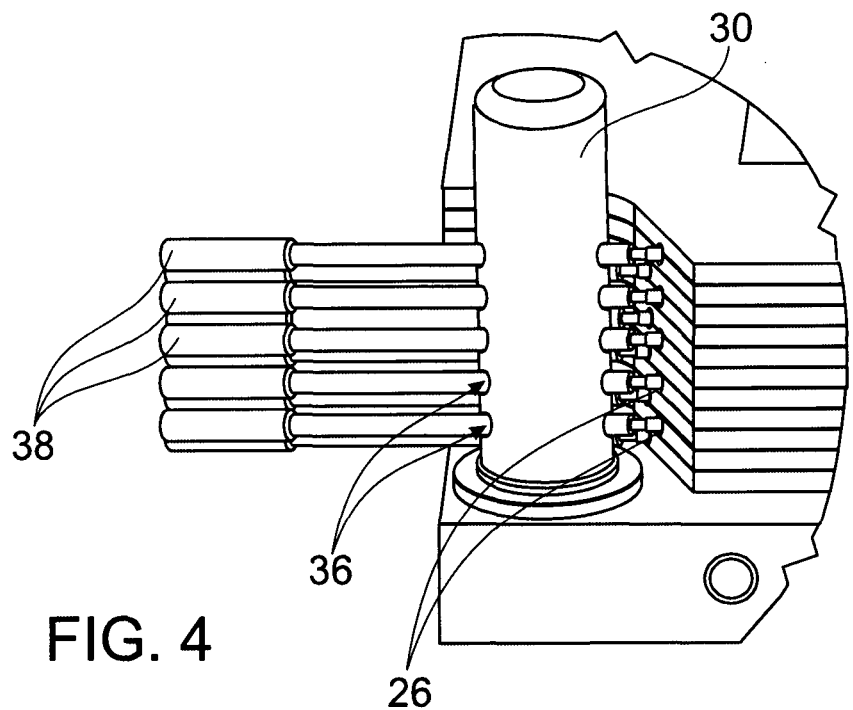
FIG. 4 is a diagrammatic perspective view of the cell stack and manifold plug of FIG. 3, showing pins which extend through the manifold plug so that their inner ends are received in capillary openings of the cell stack.

FIG. 4 shows pins 38 inserted into the holes 36 in the manifold plug 30. The pins 38 are inserted in the holes 36 in a configuration wherein the pins 38 pass through the manifold plug 30. Inner ends of the pins 38 are contiguous with the openings of the capillary tubes 26, thereby to close off the tubes 26. FIG. 4 is illustrative of the arrangement of the pins 38 relative to the manifold plug 30 and the cell stack 20, but is not illustrative of a step in the method of forming the integral manifold.

Figure 5:
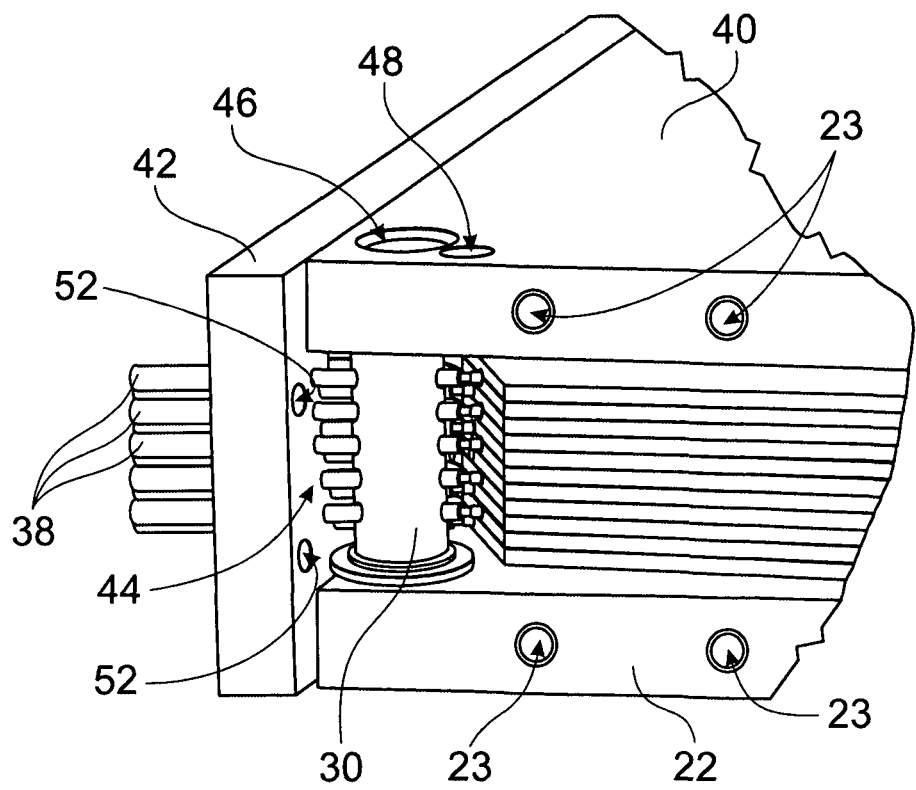
FIG. 5 is a diagrammatic perspective view of the cell stack, manifold plug and pins of FIG. 4, and further showing an end panel and top panel of the formwork.
Figure 6:
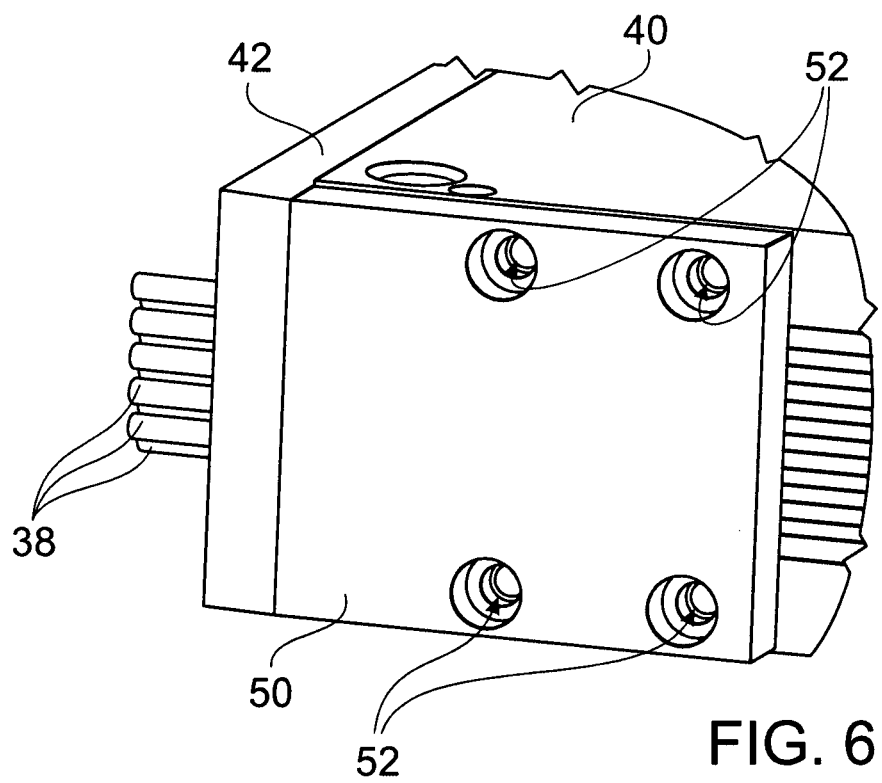
FIG. 6 is the same diagrammatic perspective view of FIG. 5, and further showing a side panel of the formwork.

FIG. 5 shows a next step in the forming of an integral manifold. A top panel 40 of formwork is placed on top of the cell stack 20 and an end panel 42 of formwork closes an end of the cell stack 20. A mould cavity 44 is defined between the bottom panel 22, top panel 40, end panel 42 and a side panel 50 (which is indicated in FIG. 6). The end panel 42 has a set of staggered holes there through which align with the holes 36 in the manifold plug 30. The top panel 40 has a fill hole 48 that is open to the mould cavity 44. In use, heated mould material is injected into the mould cavity 44 via the fill hole 48. The heated mould material can be any polymeric material that effectively bonds with the electrode plates 24 and the capillary tubes 26. The heated mould material bonds to the exposed edges of the electrode plates 24 and forms a hermetic seal between the electrode plates 24. Further, the heated mould material bonds to and forms a hermetic seal around the circumference of the outer surface of each capillary tube 26 that extends out from the edges of the electrode plates 24.

The top panel 40 further includes a hole 46 which aligns with the manifold plug 30, and in which the upper end 34 of the manifold plug 30 is received.

The pins 38 are inserted into the mould cavity via the holes in the end panel 42. The pins 38 pass through the manifold plug 30 and inner ends of the pins 38 are received in the openings of the capillary tubes 26 as described above with reference to FIG. 4.

Figure 7:
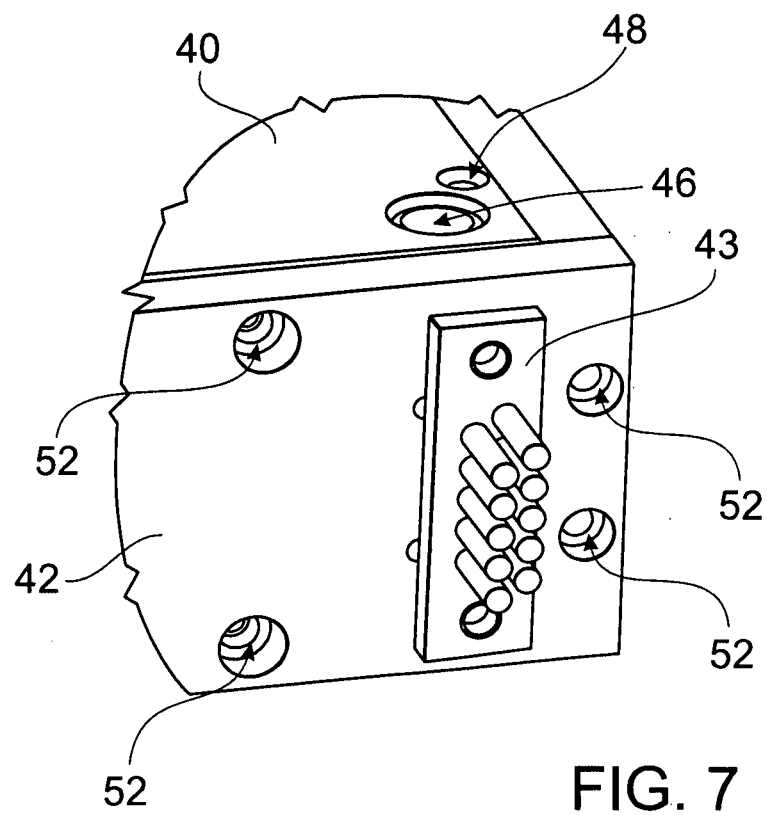
FIG. 7 shows another diagrammatic perspective view of the formwork of FIG. 6.

FIGS. 6 and 7 show different diagrammatic perspective views of a corner of the cell stack 20 clad with formwork. The formwork includes the side panel 50, which has countersunk holes 52 there through which align with the location holes 23 in the top panel 40 and bottom panel 22. The side panel 50 is fastened in position by fasteners which extend through the countersunk holes 52 to engage the location holes 23. As shown, the pins 38 also extend through staggered holes in an extraction panel 43 that is located on the outside of the end panel 42.

After the cell stack 20 is clad in formwork as shown in FIGS. 6 and 7, the mould cavity 44 is filled with mould material. For example, such mould material can be polyethylene, polypropylene, or another suitable material. The mould material is then allowed to set.

Figure 8:
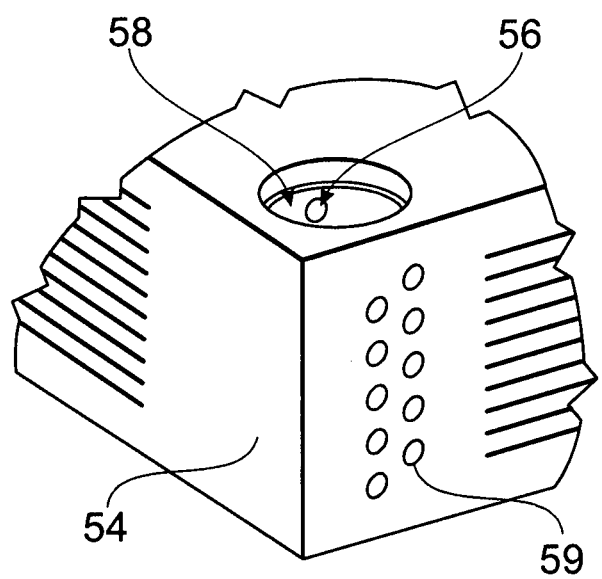
FIG. 8 is a diagrammatic perspective view of a corner of a cell stack, with all mould panels removed, showing an integral manifold formed in accordance with the invention.

With reference to FIG. 8, after the mould material has set, the fasteners holding the formwork together are removed, and the pins 38 and the respective panels 22, 40, 42 and 50 are also removed. The pins 38 are removed by pulling the extraction panel 43 away from the end panel 42. Finally, the manifold plug 30 is also removed. The resulting moulded section 54 has passages 56 which extend between a manifold cavity 58, defined by the previous location of the manifold plug 30, and the capillary tubes 26. Passages 59 that lead from the outside of the moulded section 54 to the manifold cavity 58 are then plugged. An integral manifold of the flowing electrolyte battery thus comprises the manifold cavity 58 and the passages 56 formed in the moulded section 54. The passages 56 fluidly connect the manifold cavity 58 to the capillary tubes 26.

Alternatively, a manifold cavity may be formed by omitting the manifold plug 30 from the mould cavity 44 when assembling the panels 22, 40, 42 and 50 to form a mould. After mould material has set inside the mould and the mould panels 22, 40, 42 and 50 are removed, a manifold cavity is formed by drilling a hole into the moulded section 54.

After forming an integral manifold of the present invention, side panels (not shown) can be welded onto the sides of the cell stack 20, including onto the sides of the moulded section 54, to effectively seal the cell stack. Various welding techniques for attaching such side panels are known to those having ordinary skill in the art.

Figure 9:
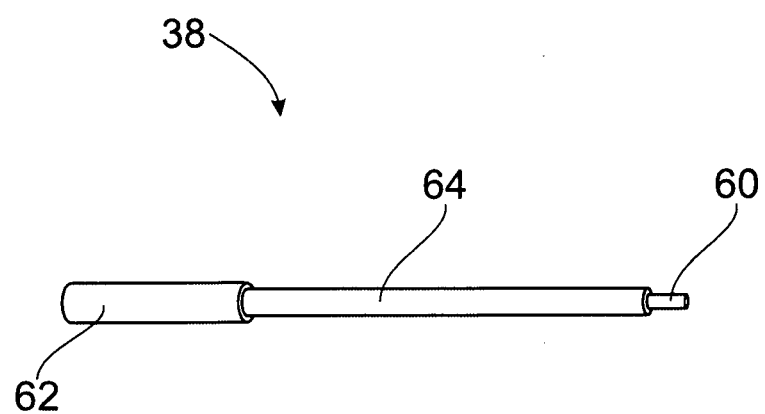
FIG. 9 shows a side view of a pin used in the method of forming the integral manifold of FIG. 8.

With reference to FIG. 9, a pin 38 has an inner end 60, a head 62, and a shank 64 that extends between the inner end 60 and the head 62. The inner end 60 is dimensioned to be received in an opening of a capillary tube 26, so as to seal the capillary tube 26 and prevent liquid mould material from blocking the opening of the capillary tube 26 when the mould cavity 44 is filled. The shank 64 is dimensioned to be received in a hole 36 in the manifold plug 30, so as to seal the manifold cavity 58 and prevent liquid mould material from entering the manifold cavity 58 when the mould cavity 44 is filled. A diameter of the head 62 is dimensioned to be larger than the holes in the extraction panel 43. As such, the pins 38 can be extracted from the mould cavity 44 by pulling the extraction panel 43 away from the end plate 42.

The integral manifold formed in the manner described hereinabove is less prone to damage than prior art external manifolds, and provides an enhanced seal between the manifold and capillary tubes of a cell stack of a flowing electrolyte battery.

A kit for forming the integral manifold comprises the manifold plug 30, the pins 38 and the panels 22, 40, 42 and 50.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. This patent specification is intended to embrace all alternatives, modifications and variations of the present invention that have been discussed herein, and other embodiments that fall within the spirit and scope of the above described invention.

The invention claimed is:

1. A method of forming passages of an integral manifold adjacent a cell stack of a flowing electrolyte battery, the method comprising:
    forming a mould cavity adjacent the cell stack, wherein the mould cavity is open to capillary openings of cells of the cell stack;
    inserting a manifold plug that defines a manifold cavity into the mould cavity, wherein the manifold plug includes a plurality of holes that are substantially parallel to each other and substantially perpendicular to a longitudinal axis of the manifold plug, and wherein each of the holes in the plurality of holes extends entirely through the manifold plug and thus has a first opening on a first side of the plug and a second opening on an opposite side of the plug;
    locating a plurality of pins in the mould cavity, each pin in the plurality of pins having a shank and an inner end, wherein the inner end is of a smaller diameter than the shank, the shank of each of the pins extends into the first opening on the first side of the plug and out the second opening on the opposite side of the plug, and wherein the inner end of each pin is positioned inside a capillary opening and the shank of each pin abuts an end of the capillary opening;
    filling the mould cavity with material;
    allowing the material to solidify into a moulded section;
    removing the pins from the moulded section and from the manifold plug;
    removing the manifold plug from the moulded section;
    whereby, passages are formed in the moulded section adjacent the manifold cavity, which passages are in fluid communication with both the capillary openings and the manifold cavity; and
    welding a side panel onto the moulded section to seal outside ends of the passages from which the pins have been removed.

2. The method of claim 1, wherein the capillary openings are defined at tube ends of capillary tubes which extend into the half cells.

3. The method of claim 1, wherein each pin in the plurality of pins has a head which is outside of the mould cavity as the material solidifies.

4. The method of claim 3, wherein the head of each pin has a larger diameter than the inner end.

5. The method of claim 1, wherein the mould cavity is formed by formwork which is removed after the moulded section is formed.

6. The method of claim 5, wherein the formwork has apertures defined therein, and each pin in the plurality of pins is located in an aperture when inserting each pin into the mould cavity.

7. The method of claim 1, wherein an extraction panel is used to remove the pins from the moulded section.

8. An integral manifold for a cell stack of a flowing electrolyte battery, wherein the integral manifold comprises passages formed according to the method of claim 1.

\* \* \* \* \*